Oct. 29, 1935.　　　　J. W. LOGAN, JR　　　　2,019,314
BRAKE CONTROL MEANS
Original Filed Jan. 19, 1934
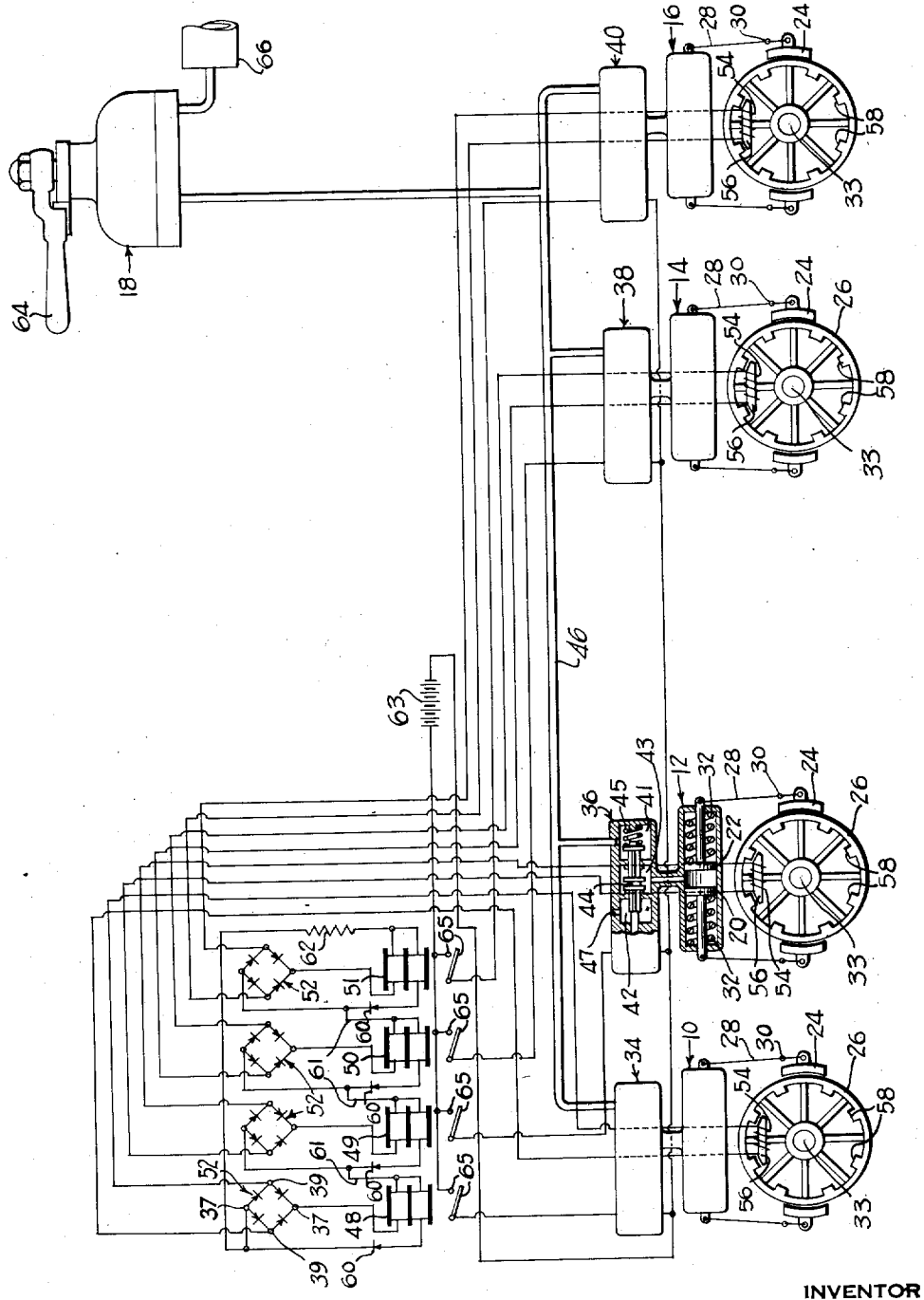
INVENTOR
JOHN W. LOGAN, JR.
BY  Wm. M. Cady
ATTORNEY Patented Oct. 29, 1935

2,019,314

UNITED STATES PATENT OFFICE 2,019,314

BRAKE CONTROL MEANS

John W. Logan, Jr., Edgewood, Pa., assignor to The Westinghouse Air Brake Company, Wilmerding, Pa., a corporation of Pennsylvania Original application January 19, 1934, Serial No. 707,282. Divided and this application January 5, 1935, Serial No. 461

21 Claims. (Cl. 303—21)

This invention relates to brake control means, and in particular to means for releasing the brakes on slipping or sliding wheels of railway vehicles. This application is a division of my copending application, Serial No. 707,282, filed January 19, 1934, for an Electropneumatic brake.

It is well known to those skilled in the art that the coefficient of friction between the rubbing parts of friction brakes commonly employed in connection with railway vehicles and trains is greater at low rotational speeds than at high rotational speeds. As a consequence, if friction brakes are applied with a maximum braking force at high speeds, the braking force must be reduced as the speed of the vehicle or train diminishes, or otherwise sliding of the wheels may be caused. Wheel sliding is objectionable in that the retarding force due to sliding wheels is less than that due to rolling wheels, and also because flat places are worn on the treads of the wheels when they slide, rendering them unfit for regular service.

It is also well known that not all of the wheels on a vehicle or train are caused to slide, but most generally only a few wheels slide. It is therefore highly desirable that means be provided for releasing the brakes on only those wheels which slide, rather than releasing the brakes on all of the vehicle or train wheels, and thereby lengthening the stop.

It is a principal object of the present invention to provide means for releasing the brakes on only those wheels which slide or reduce in speed below that corresponding to the speed of the vehicle.

Other and more specific objects of the invention will be apparent from the following description, which is taken in connection with the single figure of the attached drawing which illustrates one form which the invention may take.

Referring to this drawing, I have shown a simple straight air brake system comprising duplex brake cylinders 10, 12, 14 and 16, and a brake valve device 18 for controlling the supply of fluid under pressure to and its release from all of the brake cylinders.

The brake cylinders 10, 12, 14 and 16 are preferably duplicates, each brake cylinder containing pistons 20 and 22 adapted to move in opposite directions when fluid under pressure is supplied to the brake cylinder. When the two pistons 20 and 22 move outwardly, each actuates a shoe 24 into engagement with a brake drum 26, through a lever diagrammatically shown at 28, and pivoted intermediately its ends at 30. The two shoes 24 associated with each drum 26 are normally held out of engagement with the drum by the action of springs 32 in each of the brake cylinders. By way of illustration, I have shown four brake drums 26, each of which is associated with a vehicle axle 33, but any other number may of course be employed.

While the brake cylinders and mechanism for actuating the brake shoes have been shown in rather diagrammatic and elementary form, it is to be understood that I contemplate using a type of mechanism such as is commonly employed for fluid pressure apparatus of this type.

For controlling the supply of fluid under pressure to and its release from each of the brake cylinders 10, 12, 14 and 16, respectively, according to whether or not the wheels associated with the brake drum are rolling or sliding, I have provided magnet valve devices 34, 36, 38 and 40. Each of these magnet valve devices is embodied in a casing provided with a supply chamber 41, a release chamber 42, and an intermediate chamber 43. Disposed in the intermediate chamber 43 is a double beat valve 44. The double beat valve 44 is urged toward a left hand seated position by a spring 45, and toward a right hand seated position by action of an electromagnet in the left end of the casing, which when energized actuates the double beat valve to the right.

When the double beat valve 44 is in the left hand seated position, fluid under pressure may flow from a supply pipe 46 past the open right hand seat to the connected brake cylinder. When the double beat valve is actuated to its right hand seated position, this flow is cut off and the pressure in the brake cylinder is released to the atmosphere, past the open left hand seat, and through a port 47.

Energization of the four electromagnets in the four magnet valve devices is controlled, respectively, by four relays 48, 49, 50 and 51. Each of these relays contains an upper coil and a lower coil, as shown in the drawing. These upper and lower coils are wound oppositely, and the two coils of each relay are connected in series across output terminals 37 of a full-wave rectifier device 52, there being a rectifier device for each relay.

The input terminals 39 of each of these rectifier devices 52 are connected to a winding 54 associated with a permanent magnet 56 disposed adjacently one of the brake drums 26. Each of the brake drums 26 is provided with uniformly spaced projections 58 adapted to move past the pole pieces of one permanent magnet 56 when the associated brake drum is rotating, so that a magnetic path of periodically varying reluctance is provided through the brake drum for the flux set up by the permanent magnet.

As each of the brake drums 26 rotates then, the magnetic flux in each magnet 56 is caused to vary, and as a consequence an alternating electromotive force is generated in each winding 54. This alternating electromotive force is impressed upon the input terminals of the connected rectifier device 52, and the rectifier device delivers to the output terminals a relatively unidirectional current which flows to the connected relay.

In each of the conductors leading from the lower coil of each of the relays to the associated rectifier device 52, there is disposed a valvular device 60, which is adapted to permit the flow of current only in the direction indicated by the arrow head. This device may be of any of the types commonly employed for this purpose, as for example the copper oxide rectifier type.

The top coil of each relay is connected by a conductor 61 to the rectifier device associated with the adjacent relay, as is indicated in the drawing, so that all of the top coils form a series circuit which also includes all of the rectifier devices 52, as well as a current limiting resistance device 62, which however may not be required in all cases. The lower coil of each relay is then in effect shunted across a series combination including an upper coil and a rectifier device.

The operation of this embodiment of my invention is as follows:

When the vehicle is running, the handle 64 of the brake valve device 18 is maintained in release position. In this position each of the brake cylinders 10, 12, 14 and 16 will be vented to the atmosphere and the brakes will thus be held released.

When the train is running all of the brake drums 26 will be rotating at substantially the same speed, and the electromotive forces generated in the windings 54 will be substantially equal. The electromotive force impressed upon the input terminals of each of the rectifier devices 52 will therefore be substantially equal, and the current flowing through the series combination of the top coils of the relays will cause each of these coils to be energized alike. In a similar manner, the current flowing through the bottom coils of each of the relays will be substantially the same. The windings of the top and bottom coils are so proportioned that for this condition the magnetic effects produced by two coils neutralize each other and the relays are ineffective to close their contacts 65.

To effect an application of the brakes, the brake valve handle 64 is operated in the usual manner to supply fluid under pressure from a source of supply, as for example a reservoir 66, to the brake cylinders to a degree in accordance with a desired degree of braking.

If now with the brakes thus applied, it be assumed that the wheels associated with the extreme left hand axle 33, and brake drum 26, begin to slip and hence decrease in speed below that corresponding to the speed of the vehicle, the electromotive force generated in the winding 54 associated with that brake drum will be diminished, with the result that the current supplied to both the top and bottom coils of the relay 48 will be diminished.

The current in the bottom coil is however diminished more than the current in the top coil, as the top coil is in the series circuit which receives current from all of the windings 54, whereas the bottom coil receives current only from the one winding 54, due to action of the connected valvular device 60. The magnetic force of the top coil therefore overbalances that of the lower coil and is effective in closing the contacts 65 of relay 48. Closing of these contacts energizes the electromagnet in the magnet valve device 34, from battery 63, and its double beat valve 44 will therefore be actuated to its right hand seated position. The supply of fluid under pressure to the brake cylinder 10 will thus be cut off, and pressure in the brake cylinder released to the atmosphere. The brakes on the slipping wheels will thus be released, while the brakes on the other wheels are unaffected.

As soon as sufficient pressure has been released from the brake cylinder 10 so that the slipping wheels begin to rotate again, the electromotive force generated in the winding 54 associated with these wheels will again increase, and the current in the top and bottom coils will again balance. The contacts of relay 48 will then open, the electromagnet in the magnet valve device 34 deenergized, and fluid under pressure may again be supplied to the brake cylinder 10. If the wheels should again either slip or slide, the operation just described will be repeated.

Now the parts may be designed so that the pressure in the brake cylinder or cylinders associated with slipping wheels may be reduced fast enough to prevent the wheels from reaching a "locked wheel" stage, and all wheels thereby kept rolling.

If the wheels associated with more than one of the brake drums should slide, it will be obvious that one or more of the relays will close its contacts, to release the brakes on as many wheels as are slipping or sliding. The apparatus therefore functions to release the brakes on only those wheels which slip or slide without affecting the brakes on wheels which do not slip or slide.

While I have illustrated and described my invention in connection with one embodiment thereof, it is to be understood that I do not intend to be limited to this embodiment or otherwise than by the spirit and scope of the appended claims.

Having now described my invention, what I claim as new and desire to secure by Letters Patent, is:

1. In a vehicle brake system, in combination, a plurality of vehicle axles, a brake means associated with each of said axles, means for effecting an application of all of said brake means, a plurality of electrical devices each of which has a balanced and an unbalanced position, means for maintaining all of said electrical devices in said balanced position so long as all of said axles are rotating at substantially the same speed, means for unbalancing one or more of said electrical devices when one or more of said axles reduce in speed below that of the other of said axles, and means operative when one or more of said electrical devices are in unbalanced position for releasing the brake means on one or more of said axles which reduce in speed.

2. In a vehicle brake system, in combination, a plurality of vehicle axles, a brake cylinder associated with each of said axles, means for supplying fluid under pressure to all of said brake cylinders to produce a braking effect on said axles, a plurality of electrical relays each of which is associated with one of said axles and each of which has a balanced and an unbalanced position, means for maintaining all of said relays in a balanced position so long as all of said axles are rotating at substantially the same speed, means operative when one or more of said axles reduce in speed below that of the other of said axles for unbalancing the relays associated with the axles which reduce in speed, and means rendered operative by the unbalanced relays for cutting off the supply to and releasing fluid under pressure from the brake cylinders associated with the axles which reduce in speed.

3. In a vehicle brake system, in combination, brake means for producing a braking effect on the vehicle wheels, means for effecting an application of the brake means, a plurality of electroresponsive devices each of which is associated with one or more vehicle wheels, each of said devices having a winding, means for forming a series circuit including the winding from each of said devices, contacts associated with each of said devices and closable when current is supplied to said series circuit, means for supplying current to said series circuit, means for preventing closing of said contacts so long as all of the vehicle wheels are rolling and operable to permit closing of the contacts of the devices associated with sliding wheels, and means responsive to closing of said contacts for effecting a release of the brake means associated with sliding wheels.

4. In a vehicle brake system, in combination, brake means for producing a braking effect on the vehicle wheels, means for effecting an application of the brake means, a plurality of relays each of which is associated with one or more vehicle wheels, each of said relays having normally open contacts and a winding adapted when energized to close said contacts, means for forming a series circuit including the windings from all of said relays, means for supplying current to said series circuit, means for preventing closing of the contacts of any of the relays when current is supplied to said series circuit so long as all of the vehicle wheels are rolling at substantially the same speed, means operable to effect closing of the contacts of the relays associated with wheels which begin to slip, and means responsive to the closing of the contacts of one or more of said relays for effecting a release of the brake means on wheels associated with those relays.

5. In a vehicle brake system, in combination, brake means for producing a braking effect on the vehicle wheels, means for effecting an application of the brake means, a plurality of relays each of which is associated with one or more vehicle wheels, each of said relays having two windings and normally open contacts adapted to be closed when the magnetic force produced by energization of one of said windings overbalances the magnetic force produced by energization of the other of said windings, means for forming an interconnected group including a winding from each of said relays, means for supplying current to the windings in said interconnected group to a degree sufficient to close the contacts of each relay, means for supplying current to the other windings of said relays to a degree sufficient to prevent closing of said contacts, means for causing the current supplied to any one or more of said other windings to decrease sufficiently to permit closing of the contacts of the associated one or more relays when wheels associated with those relays begin to slide, and means responsive to closing of the contacts of one or more of said relays for releasing the brake means on wheels associated with those relays.

6. In a vehicle brake system, in combination, a plurality of brake cylinders, means for supplying fluid under pressure to all of said brake cylinders, an electroresponsive valve device associated with each of said brake cylinders and operable when energized to cut off the supply to and release of fluid under pressure from the associated brake cylinder, a plurality of relays each of which is adapted to control energization of one of said electroresponsive valve devices, each of said relays having two windings oppositely wound, means for forming a series circuit including a winding from each of said relays, means associated with all of the vehicle wheels for supplying current to said series circuit and to each relay winding not connected in said series circuit, means operable to decrease the current in the winding not connected in said series circuit below that of the winding connected in said series circuit of any one relay when the wheels associated with that relay begin to slip, whereby that relay is operated to close its contacts, and means responsive to closing of the contacts of that relay for energizing the electroresponsive device associated with the slipping wheels.

7. In a vehicle brake system, in combination, a plurality of rotatable members, a brake cylinder associated with each of said members, means for supplying fluid under pressure to all of said brake cylinders, a plurality of sources of current supply each of which is associated with a different one of said rotatable members, a plurality of relays each of which has two windings and contacts adapted to be operated when the energization of one winding is decreased a predetermined amount below the energization of the other winding, means for forming a series circuit including a winding from each of said relays and including all of said sources of current supply, means for connecting each of the other windings of said relays to a different one of said sources of current supply, means whereby when the current supplied by a source decreases due to a decrease in rotation of the associated rotatable member below the speed of rotation of the other rotatable members the energization of the said other winding connected to said source is decreased sufficiently to cause the one relay to operate its contacts, and means responsive to operation of the contacts of the one relay for cutting off the supply to and releasing fluid under pressure from the associated brake cylinder.

8. In a vehicle brake system, in combination, a plurality of brake means, means for effecting an application of all of the brake means, a plurality of sources of current supply, a plurality of contacts, a plurality of windings adapted when energized to operate said contacts, means for connecting said windings and said sources in a series circuit to energize said windings, means responsive to current supplied by each of said sources for preventing each of said windings individually from operating said contacts, means operable upon a decrease of current supplied by any one or more of said sources to cause one or more of said windings to operate contacts associated with said one or more windings, and means responsive to operation of said contacts for effecting a release of one or more of said brake means.

9. In a vehicle brake system, in combination, a plurality of rotatable braking elements, a generator associated with each of said elements and adapted to produce a current when said element is rotating, a brake cylinder associated with each of said elements, means for supplying fluid under pressure to all of said brake cylinders, a plurality of relays each of which has normally open contacts and two oppositely wound coils, a plurality of rectifier devices each of which is connected to a different one of said generators, means for forming a series circuit including a winding from each of said relays and all of said rectifier devices, means for connecting each of the other coils of said relays to a different one of said rectifier devices, and means rendered operable when the current produced by one of said generators decreases by a predetermined amount below the current produced by the other of said generators for causing the associated relay to close its contacts, and means responsive to closing of said contacts for cutting off the supply to and releasing fluid under pressure from the brake cylinder associated with said one generator.

10. In a vehicle brake system, in combination, a plurality of brake cylinders, means for supplying fluid under pressure to all of said brake cylinders, a generator associated with each of said brake cylinders and operable to produce a current while the vehicle is in motion, a plurality of relays each of which has a first coil and a second coil, means for connecting all of the first coils in a series circuit, means for supplying current to said series circuit from all of said generators, means for connecting the second coil of each relay in shunt with the first coil of that relay, a valvular device connected in series with each of said second coils, contacts associated with each of said relays and adapted to be operated when the energization of said first coil exceeds by a predetermined amount the energization of said second coil, said valvular devices being effective to cause the first coil of one relay to be energized greater than the second coil of that relay by said predetermined amount upon a decrease in current supplied by one of said generators, and means controlled by said contacts for controlling the supply of fluid under pressure to and its release from said brake cylinders.

11. In a vehicle brake system, in combination, two brake cylinders, means for supplying fluid under pressure to the two brake cylinders, two relays each of which has two windings oppositely wound and contacts adapted to be operated when energization of one winding exceeds energization of the other winding by a predetermined amount, means for forming a series circuit including a winding from each of said relays, means for supplying current to said series circuit and to each of the other windings of said relays, means operable upon a sliding of a vehicle wheel for decreasing the current in one of the windings not connected in said series circuit, whereby the relay associated with that winding is caused to operate its contacts, and means responsive to operation of the contacts of that relay for cutting off the supply to and releasing fluid under pressure from one brake cylinder.

12. In a vehicle brake system, in combination, two rotatable brake members, a generator and a brake cylinder associated with each of said brake members, means for supplying fluid under pressure to both of said brake cylinders, two relays each of which has two windings and contacts adapted to be operated when energization of one of said windings exceeds energization of the other of said windings by a predetermined amount, means for forming a series circuit including a winding of each of said relays, means for supplying current to said series circuit from both of said generators, means for connecting the other winding of each relay in shunt with the first mentioned winding of that relay, means operable upon a decrease in current supplied by one of said generators for decreasing the current in one of the second mentioned windings of one of said relays whereby that relay is caused to close its contacts, and means rendered operable upon closing of said contacts for cutting off the supply to and releasing fluid under pressure from one of said brake cylinders.

13. In a vehicle brake system, in combination, a plurality of rotatable braking elements, an alternating current generator associated with each of said elements and adapted to produce an alternating current when said element is rotating, a brake cylinder associated with each of said elements, means for supplying fluid under pressure to all of said brake cylinders, a plurality of relays each of which has normally open contacts and two oppositely wound coils, a plurality of rectifier devices for changing the alternating current to direct current each of which is connected to a different one of said generators, means for forming a series circuit including a winding from each of said relays and all of said rectifier devices, means for connecting each of the other coils of said relays to a different one of said rectifier devices, and means rendered operable when the current produced by one of said generators decreases by a predetermined amount below the current produced by the other of said generators for causing the associated relay to close its contacts, and means responsive to closing of said contacts for cutting off the supply to and releasing fluid under pressure from the brake cylinder associated with said one generator.

14. In a brake equipment for vehicles, in combination, a plurality of brake cylinders one associated with each vehicle wheel axle, means for supplying fluid under pressure to said brake cylinders to apply the brakes, electrical means associated with each of the several vehicle wheel axles, and means responsive to a differential relation between said electrical means set up when the wheels associated with one axle slide for effecting the release of fluid under pressure from the brake cylinder associated with the sliding wheels.

15. In a brake equipment for vehicles, in combination, a plurality of brake cylinders associated with separate vehicle wheel axles, means for supplying fluid under pressure to said brake cylinders to apply the brakes, electrical means associated with each of the several vehicle wheel axles for controlling an electric quantity in accordance with variations in the speed of its associated vehicle wheels, and means responsive to a differential relation between said electrical quantities set up when one axle is revolving at a slower rate of speed than the other axle for effecting the release of fluid under pressure from a brake cylinder associated with the vehicle wheel axle that is revolving at the slower rate of speed.

16. In a brake equipment for vehicles, in combination, a plurality of pairs of car wheels, braking means associated with each of said pairs of wheels, electrical means operable while the brakes are applied, and differentially responsive to a variation in the speed of rotation between said pairs of car wheels for reducing the degree of application of the brakes on a pair of wheels that operate at a slower rate of speed than other pairs of wheels.

17. In a brake equipment for vehicles, in combination, a plurality of pairs of car wheels, braking means associated with each of said pairs of wheels, electrical means associated with each pair of car wheels for delivering an output voltage that is a measure of the speed of the wheels, common means connecting said several electrical means, and electrical means responsive to a variation in the speed of rotation between said pairs of car wheels for effecting a reduction in the degree of application of the brakes on a pair of wheels that operate at a slower rate of speed than other pairs of wheels.

18. In a brake equipment for vehicles, in combination, a plurality of groups of vehicle wheels, a brake cylinder associated with each wheel group, an electrical means associated with each wheel group and responsive to the speed thereof, and means responsive to a reduction in the speed of the wheels of one group with respect to the speed of the wheels of other groups and controlled by said electrical means for effecting the release of fluid under pressure from the brake cylinder associated with said first named wheel group.

19. In a brake equipment for vehicles, in combination, a plurality of pairs of vehicle wheel groups, a brake cylinder associated with each pair of wheels, a brake valve for controlling the supply of fluid under pressure to said brake cylinders to apply the brakes, an electric generator associated with each pair of wheels and operated in accordance with the speed thereof, a common circuit connecting said several generators, relay means responsive to a reduction in the speed of one of said generators with respect to the speed of other of said generators for controlling the release of fluid under pressure from its associated brake cylinder independently of the operation of said brake valve.

20. In a brake equipment for vehicles, in combination, braking means, manually operable means for controlling the application and release of the brakes, electrically operable means for decreasing the degree of application of the brakes independently of said manually operable means, and control means therefor comprising contact means differentially responsive to the speeds of the vehicle wheels.

21. In a brake equipment for vehicles, in combination, a brake cylinder, manually operable means for controlling the suply of fluid under pressure to and from said brake cylinder, electrical means operable to release fluid under pressure from said brake cylinder independently of said manually operable means, a source of electric energy, and means responsive to a fixed differential between the speed of the vehicle and the speed of the vehicle wheel for operatively relating said electrical means and said source.

JOHN W. LOGAN, Jr.